United States Patent [19]
Härtel et al.

[11] Patent Number: 5,457,957
[45] Date of Patent: Oct. 17, 1995

[54] METHOD AND APPARATUS FOR HEATING A CATALYTIC CONVERTER UPON COLD ENGINE STARTING

[75] Inventors: Günter Härtel, Neuss; Armin Schürfeld, Meerbusch, both of Germany

[73] Assignee: Pierburg GmbH, Neuss, Germany

[21] Appl. No.: 214,361

[22] Filed: Mar. 16, 1994

[30] Foreign Application Priority Data

Mar. 17, 1993 [DE] Germany .......................... 43 08 485.0

[51] Int. Cl.⁶ .................................................. F01N 3/28
[52] U.S. Cl. .............................. 60/274; 60/284; 60/299; 60/303
[58] Field of Search ...................... 60/274, 284, 303, 60/299

[56] References Cited

U.S. PATENT DOCUMENTS

| | | | |
|---|---|---|---|
| 3,273,971 | 9/1966 | Baddorf | 60/284 |
| 3,775,064 | 11/1973 | Berger | 60/284 |
| 3,791,143 | 2/1974 | Keith | 60/284 |
| 3,854,288 | 12/1974 | Heitland | 60/284 |

FOREIGN PATENT DOCUMENTS

| | | |
|---|---|---|
| 2219371 | 8/1971 | Germany . |
| 2129023 | 12/1972 | Germany . |
| 2131321 | 6/1984 | United Kingdom . |
| 2260279 | 4/1993 | United Kingdom . |
| 2261176 | 5/1993 | United Kingdom . |
| 920883 | 5/1992 | WIPO . |
| 9208883 | 5/1992 | WIPO . |
| 9222734 | 12/1992 | WIPO . |
| 9307365 | 12/1992 | WIPO . |

OTHER PUBLICATIONS

Derwent publication Ltd Abstract of WO92/08883.

*Primary Examiner*—Douglas Hart
*Attorney, Agent, or Firm*—Ladas & Parry

[57] ABSTRACT

A pre-heating arrangement for a catalytic converter of an internal combustion engine having a pre-heating burner operated according to a control and regulation program in the cold-running state of the internal combustion engine after start up. The catalytic converter (2) is formed by two converter elements (4, 5) between which is a converter chamber (6). Hot gases from the burner enter the converter chamber (6) and mix thereat with the exhaust gas from the internal combustion engine and heat the converter element (5) which is second in line in the direction of engine exhaust gas flow. The first converter element (4) on the upstream side, which is subject to impairment due to aging, is by-passed by the hot gases from the burner, which are thereby employed efficiently to rapidly bring the second catalytic converter element (5) up to operating temperature.

6 Claims, 1 Drawing Sheet

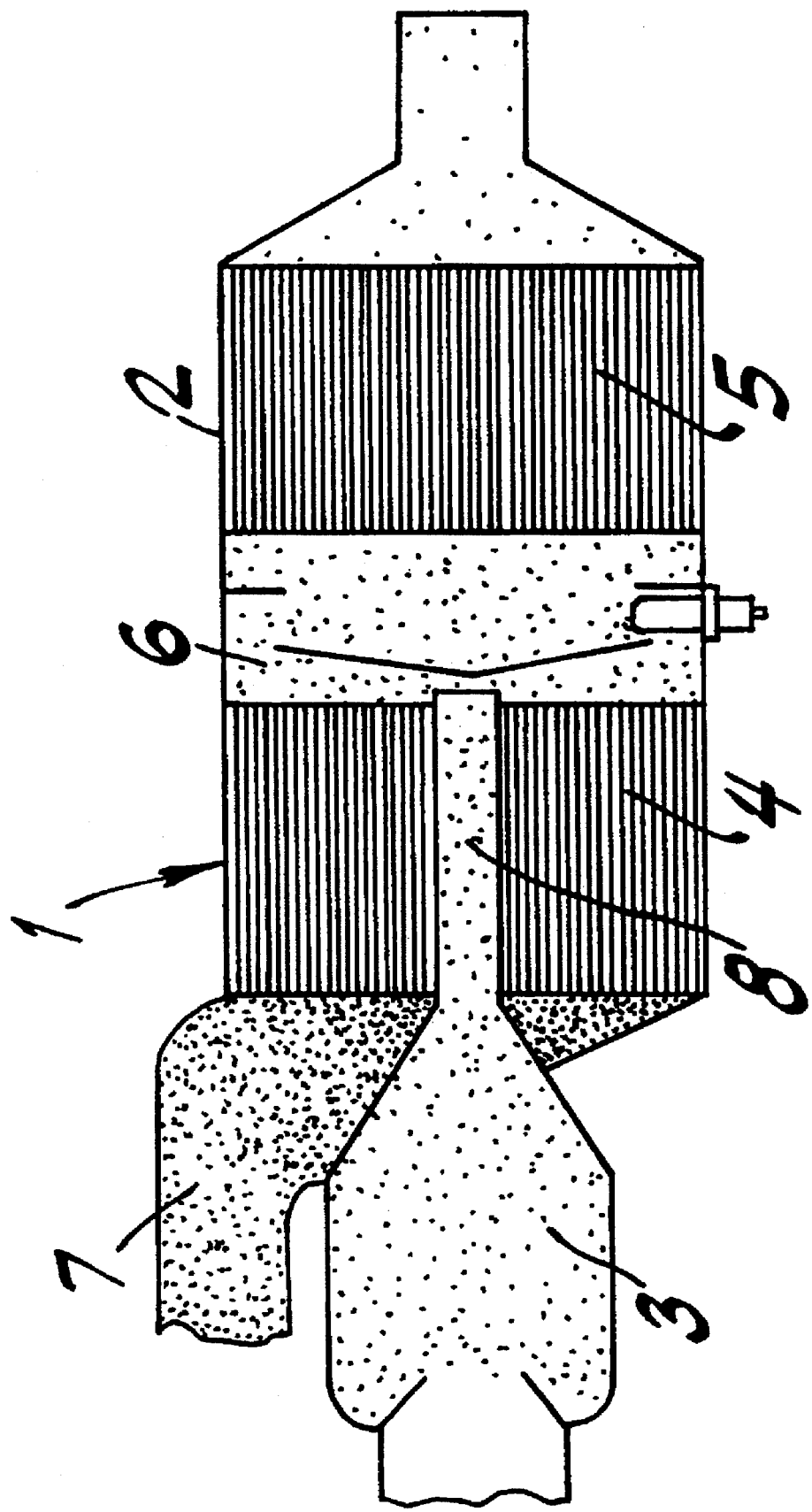

METHOD AND APPARATUS FOR HEATING A CATALYTIC CONVERTER UPON COLD ENGINE STARTING

FIELD OF THE INVENTION

The invention relates to apparatus for heating a catalytic converter in the exhaust system of an internal combustion engine at the time of starting a cold engine.

More particularly, the invention relates to such apparatus in which the engine is provided with a pre-heating burner for producing hot gases to be supplied to the catalytic converter at the time of starting a cold engine.

The invention further relates to a method of heating the catalytic converter upon starting a cold engine.

BACKGROUND AND PRIOR ART

The first two minutes after starting a cold engine are decisive for emission of pollutants in the exhaust gases of an internal combustion engine. It is in this period that about 70–80% of the total emissions of HC and CO are discharged. Because the catalytic converter has not yet reached its operating temperature within this time period, the engine discharges virtually raw emissions.

Various means are known for shortening this period, for example, by using a burner system to heat the catalytic converter as disclosed in DE-A-22 19 371, in an attempt to achieve operational readiness more quickly after a cold start.

Irrespective of the construction and mode of operation of the burner system, conventionally, the raw exhaust gases of the internal combustion engine are mixed with hot gases from the burner system before the exhaust gas mixture enters the catalytic converter. As the catalytic converter ages, it is known that impairment in its operation starts at the front or inlet of the catalytic converter for engine exhaust gases. When such aging occurs, the catalyst in the catalytic converter is heated at the inlet by the hot gases from the known burner system, but this has little effect on the conversion rate of pollutant reduction as the operation of the catalytic converter at its inlet end is the first to be impaired and the remaining part of the catalytic converter is not yet sufficiently heated to reach an efficient operating temperature. As a result, the discharged exhaust gases comprise virtually raw emissions.

SUMMARY OF THE INVENTION

An object of the invention is to provide a pre-heating system by which substantially no raw emissions are discharged even when there is a certain degree of impairment of the operation of the catalytic converter.

In accordance with the invention, the pre-heating apparatus contemplates forming the catalytic converter with first and second sections arranged one after the other in a direction of flow of the exhaust gases from the internal combustion engine through the catalytic converter, and providing a chamber between the first and second sections so that the exhaust gases will flow through the chamber when passing from the first section of the catalytic converter to the second section of the catalytic converter, the chamber being supplied with hot gases from the pre-heating burner such that the exhaust gases from the internal combustion engine mix with the hot gases from the burner and the mixed gases then pass through the second section of the catalytic converter.

In this way, the second section of the catalytic converter is the heated element and the first section, which is subject to impairment due to aging, is bypassed by the hot gases from the burner. Hence, the hot gases are employed efficiently to bring the second section of the catalytic converter rapidly to a working temperature to remove the pollutant emission products from the engine exhaust gases.

Preferably, the hot gases from the burner enter the converter chamber via a burner pipe which extends through the first converter section into the converter chamber. Alternatively, the pipe conveying the hot gases from the burner enters the converter chamber laterally without passing through the first section of the catalytic converter. Thereby, the first and second converter elements can be identical.

In accordance with the method of the invention, the hot gases from the burner are supplied to the chamber between the first and second sections of the catalytic converter so that the hot gases bypass the first section and enter the second section of the catalytic converter after mixing with the exhaust gases from the internal combustion engine in said chamber.

BRIEF DESCRIPTION OF THE FIGURE OF THE DRAWING

The sole FIGURE of the drawing is a diagrammatic longitudinal cross-section through an exhaust pipe system containing a catalytic converter system according to the invention.

DETAILED DESCRIPTION OF A PREFERRED EMBODIMENT

The drawing shows schematically an exhaust pipe system 1 of an internal combustion engine having a catalytic converter 2 and a burner system 3 in which air and fuel are ignited to produce hot gases which are introduced into the exhaust pipe system 1.

According to the invention, the catalytic converter 2 comprises two elements or sections 4, 5, the first element 4 being upstream in the direction of flow of engine exhaust gases while the second element 5 is downstream of element 4. Between the two elements 4 and 5 is a converter chamber 6 into which hot gases from the burner 3 are introduced. In the chamber 6 the hot gases from burner 3 mix with the exhaust gases from the internal combustion engine, which are supplied to an inlet end of the catalytic converter by an exhaust pipe 7. The engine exhaust gases first pass through the first converter element 4, then mix with the hot gases from burner 3 in chamber 6 and then flow together with the hot gases from the chamber 6 through the second converter element 5, the latter thereby being rapidly brought up to operating temperature. Advantageously, the hot housing walls of the burner system 3 are introduced in the flow of the exhaust gases to produce therein a thermal reactor effect.

Aging of the catalytic converter may reduce or even eliminate the effectivity of the first converter element 4. The engine exhaust gases passing through the first converter section 4, which is not at operating temperature, are catalytically purified by the second converter element 5, which is at operating temperature. Operation of the burner 3 is required for only about 15–20 seconds, until the second converter element 5 has reached operating temperature.

The arrangement of the converter elements 4, 5 and of the burner system 3 can be varied as desired within the scope of the invention.

In the illustrated embodiment, the hot gases from the burner 3 enter the converter chamber 6 via a burner pipe 8 which extends axially through the first converter element 4. Thereby, the two elements 4 and 5 are not identical. However, it may, under certain circumstances, be more advantageous to use identical converter elements, in which case, the burner pipe laterally enters the converter chamber 6 without passing through the first element 4.

The catalytic converter can include a temperature detector (not shown) and an exhaust gas sensor (not shown), connected to an electronic control unit (not shown) which operates a control and regulation program stored in said unit for controlling the activation and time of operation of burner system 3.

By virtue of the apparatus and method according to the invention, a high pollutant conversion rate is obtained during operating states having relatively high pollutant emissions, such as following cold starting of the internal combustion engine. Thereby, lower exhaust emissions are obtained after a cold engine start even with a catalytic converter which has already aged.

Although the invention has been described in conjunction with a specific embodiment thereof it will become apparent to those skilled in the art that numerous modifications and variations can be made within the scope and spirit of the invention as defined in the attached claims.

What is claimed is:

1. Pre-heating apparatus for a catalytic converter included in an exhaust system of an internal combustion engine having a burner for supplying hot gases to the catalytic converter, said catalytic converter comprising first and second sections arranged one after the other in a direction of flow of exhaust gases from the internal combustion engine through the catalytic converter, a chamber disposed between said sections for flow through said chamber of the exhaust gases from the first section of the catalytic converter to the second section of the catalytic converter, and means for supplying hot gases from the burner to said chamber whereat said exhaust gases from the internal combustion engine mix with said hot gases from the burner and then pass through the second section of the catalytic converter, said means for supplying hot gases from the burner to said chamber comprising a pipe passing through said first section of the catalytic converter into said chamber.

2. Apparatus as claimed in claim 1, wherein said pipe passes axially through said first section of the catalytic converter.

3. Apparatus as claimed in claim 1, wherein said catalytic converter has an inlet for said exhaust gases at an inlet end of said first section of the catalytic converter.

4. A method of heating a catalytic converter during initial start-up of a cold internal combustion engine to minimize pollutants in the engine exhaust gases, said method comprising:

producing hot gases in a burner upon starting a cold internal combustion engine, forming a chamber in the catalytic converter between first and second sections of the catalytic converter through which the exhaust gases pass in sequence, conveying the hot gases to said chamber through a pipe passing through said first section of the catalytic converter into said chamber, heating the exhaust gases as the exhaust gases pass through said first section by contact with said pipe, mixing in said chamber the exhaust gases which have passed through the first section of the catalytic converter with the hot gases conveyed to the chamber by said pipe from the burner, and passing the mixture of the exhaust gases and hot burner gases from said chamber through the second section of the catalytic converter.

5. Apparatus as claimed in claim 1, wherein said catalytic converter comprises a casing in which the first and second catalytic converter sections are axially spaced apart to form said chamber therebetween, said pipe extending axially through said first section to said chamber to supply the heated gases into said chamber, said casing having an inlet for flow of exhaust gases axially through said first section to said chamber, said exhaust gases being heated by said pipe as said exhaust gases flow axially through said first section.

6. A method as claimed in claim 4, comprising disposing said pipe in said first section of the catalytic converter substantially coaxially with the flow of the exhaust gases passing through said first section.

* * * * *